(12) United States Patent
Madukkarumukumana et al.

(10) Patent No.: US 7,400,639 B2
(45) Date of Patent: Jul. 15, 2008

(54) METHOD, SYSTEM, AND ARTICLE OF MANUFACTURE FOR UTILIZING HOST MEMORY FROM AN OFFLOAD ADAPTER

(75) Inventors: Rajesh S. Madukkarumukumana, Portland, OR (US); Jie Ni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 10/637,370

(22) Filed: Aug. 7, 2003

(65) Prior Publication Data

US 2005/0030972 A1 Feb. 10, 2005

(51) Int. Cl.
*H04L 12/54* (2006.01)
*H04L 12/66* (2006.01)
*H04J 3/24* (2006.01)

(52) U.S. Cl. .................. 370/429; 370/463; 370/474

(58) Field of Classification Search ................ 370/429, 370/463, 411, 412, 413, 474, 476, 395.41, 370/395.52, 395.53, 428, 465; 395/200, 395/250, 275
See application file for complete search history.

(56) References Cited

U.S. PATENT DOCUMENTS

| | | | | |
|---|---|---|---|---|
| 5,293,487 A | | 3/1994 | Russo et al. ................. | 395/200 |
| 5,307,459 A | | 4/1994 | Peterson et al. ............. | 395/200 |
| 5,937,169 A | * | 8/1999 | Connery et al. ............. | 709/250 |
| 6,141,705 A | | 10/2000 | Anand et al. | |
| 6,788,704 B1 | * | 9/2004 | Lindsay ...................... | 370/465 |
| 6,857,030 B2 | | 2/2005 | Webber | |
| 6,928,482 B1 | | 8/2005 | Ben Nun et al. | |
| 2002/0107804 A1 | | 8/2002 | Kravitz | |
| 2003/0135757 A1 | | 7/2003 | Conner et al. ............... | 713/201 |
| 2003/0161327 A1 | * | 8/2003 | Vlodavsky ............. | 370/395.52 |
| 2004/0049580 A1 | * | 3/2004 | Boyd et al. ................. | 709/226 |
| 2004/0095882 A1 | * | 5/2004 | Hamzah et al. ............. | 370/229 |

OTHER PUBLICATIONS

Information Sciences Institute, "Internet Protocol", *DARPA Internet Program Protocol Specification*, [online], RFC 791, Sep. 1981, pp. 1-44, [Retrieved on Mar. 24, 2004]. Retrieved from the Internet at <URL: http://www.faqs.org/rfcs/rfc791.html>.

Information Sciences Institute, "Transmission Control Protocol", *DARPA Internet Program Protocol Specification*, [online], RFC 793, Sep. 1981, pp. 1-84, [Retrieved on Mar. 24, 2004]. Retrieved from the Internet at <http://www.faqs.org/rfcs/rfc 793.html>.

(Continued)

*Primary Examiner*—Melvin Marcelo
*Assistant Examiner*—Farah Faroul
(74) *Attorney, Agent, or Firm*—Konrad Raynes & Victor LLP; Rabindranath Dutta

(57) ABSTRACT

Provided are a method, system, and article of manufacture, wherein in one implementation of the method a memory buffer is allocated in a host memory by a protocol processor, wherein the host memory is comprised in a host that is coupled to a network adapter. A packet is processed initially at the network adapter to generate data for offloading to the memory buffer in the host. The generated data is offloaded by the protocol processor to the memory buffer in the host. The offloaded data is processed by the protocol processor.

28 Claims, 6 Drawing Sheets

OTHER PUBLICATIONS

Mclean, P. T., (Tech. Ed.), "Information Technology- AT Attachment-3 Interface (ATA-3)", X3T10, 2008D, Revision 5, Oct. 6, 1995.

Monia, C. (Tech. Ed.), "Information Technology- SCSI-3 Architecture Model", X3T10, 994D, Revision 18, Nov. 27, 1995.

U.S. Appl. No. 10/448,797, filed May 30, 2003, entitled "Method, System, and Article of Manufacture for Network Protocols", invented by A.R. Davis, R. S. Madukkarumukumana, & S.C. Smith.

U.S. Appl. No. 10/695,006, filed Oct. 27, 2003, entitled "Method, Apparatus, System, and Article of Manufacture for Processing Control Data by an Offload Adapter", invented by R. S. Madukkarumukumana, & J. NI.

Yeh, E., H. Chao, V. Mannem, J. Gervais, and B. Booth, "Introduction to TCP/IP Offload Engine (TOE)", Version 1.0, Apr. 2002.

PCT International Search Report and Written Opinion, Dec. 13, 2004, for International Application No. PCT/US2004/024468.

PCT International Preliminary Examination Report (IPRP), Feb. 23, 2006, for International Application No. PCT/US2004/024468.

Taiwan Official Letter, Nov. 17, 2005, for ROC Application No. 93122715.

EP First Office Action, Jun. 8, 2007, for European Application No. 04757368.8- 2416, 5 pp.

* cited by examiner tion. A host system 110 may be connected to a plurality of computational devices 102a . . . 102n over a network 104. The host system 100 sends and receives packets over the network 104. The packets may be for communication between the host system 100 and one or more of the computational devices 102a . . . 102n. The host system 100 may be any computational device known in the art, such as a personal computer, a workstation, a server, a mainframe, a hand held computer, a palm top computer, a laptop computer, a telephony device, a network computer, etc. The computational devices 102a . . . 102n may include various types of computers, routers, storage devices, etc. The network 104 may be any network known in the art, such as the Internet, an intranet, a Local area network (LAN), a Storage area network (SAN), a Wide area network (WAN), a wireless network etc. Also the network 104 may be part of one or more larger networks or may be an independent network or may be comprised of multiple interconnected networks. In certain embodiments, the network 104 may be implemented with high speed switching technologies, such as, Gigabit Ethernet technology.

METHOD, SYSTEM, AND ARTICLE OF MANUFACTURE FOR UTILIZING HOST MEMORY FROM AN OFFLOAD ADAPTER

BACKGROUND

1. Field

The disclosure relates to a method, system, and an article of manufacture for utilizing host memory from an offload adapter.

2. Background

A network adapter may be coupled to a host system to provide network communications. Some network adapters may provide hardware support for the processing of packet data and control data related to the Transmission Control Protocol/Internet Protocol (TCP/IP) protocol that may be used for network communications. Such network adapters may be referred to as TCP/IP offload engine (TOE) adapters. Further details of the TCP/IP protocol are described in the publication entitled "Transmission Control Protocol: DARPA Internet Program Protocol Specification," prepared for the Defense Advanced Projects Research (RFC 793, published September 1981).

TOE adapters may perform all or major parts of the TCP/IP protocol processing, whereas other network adapters may perform transmission and reception of network packets and provide some support for checksum offloading or fragmentation and reassembly of packets. High speed switching technologies, such as, Gigabit Ethernet, may be used for connecting the host system to a network. As a result a TOE adapter coupled to the host system may have to handle a large number of network connections. The flow of packets to and from the host system in such high speed switching technologies may be high. The TOE adapter may be required to process a large number of packets at a rate that is adequate for the flow of packets. Further details of the TOE adapter in the Gigabit Ethernet environment are described in the publication entitled "Introduction to the TCP/IP Offload Engine" available from the 10 Gigabit Ethernet Alliance (published April, 2002).

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

The embodiments comprise a protocol processor, such as, a protocol processing application, in a network adapter coupled to a host system. A protocol processor is capable of processing commands related to a networking protocol. In these embodiments, the protocol processing application utilizes the memory in the host system for protocol processing and data staging and minimizes memory requirements in the network adapter.

Figure 1:
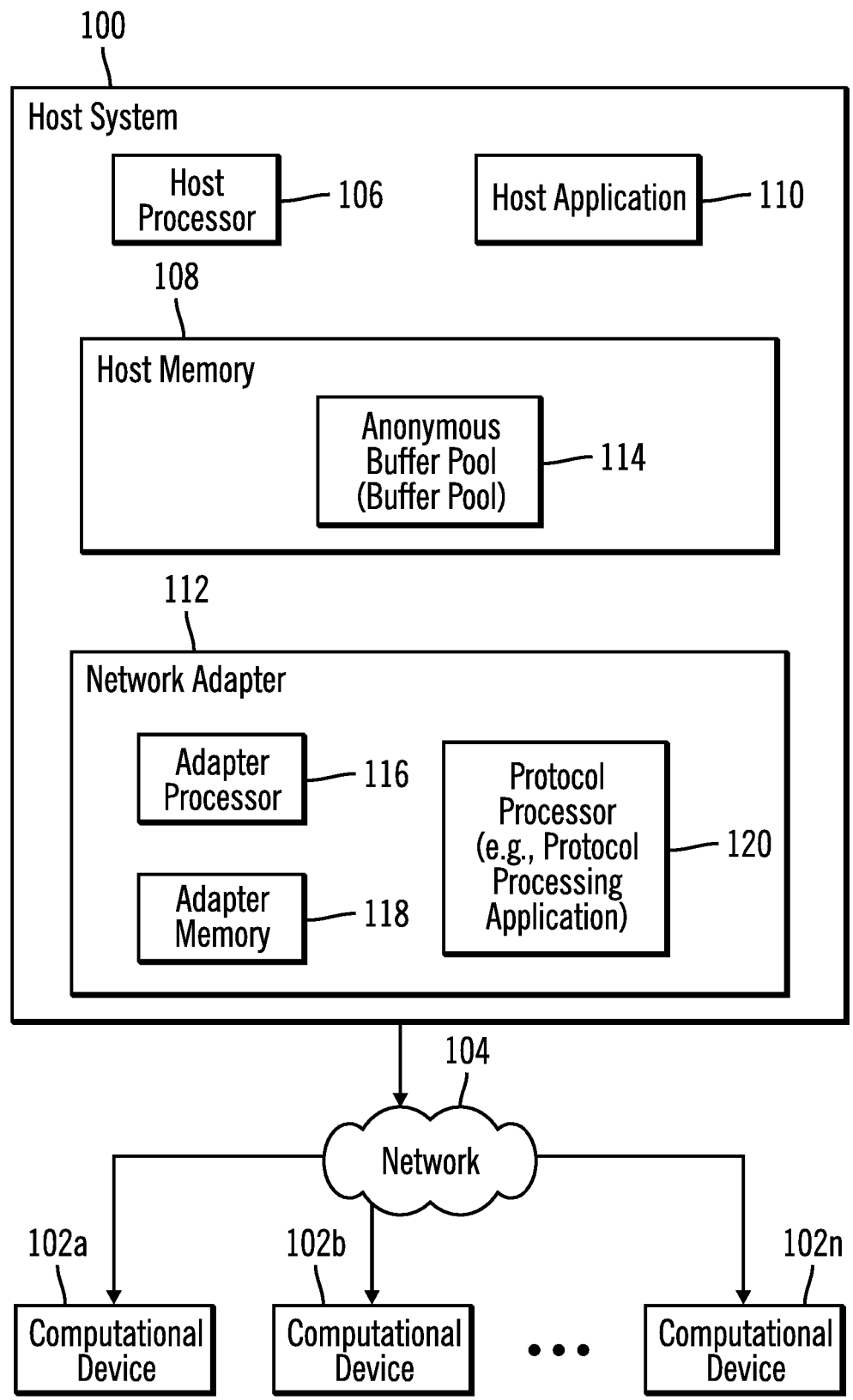
FIG. 1 illustrates a block diagram of a computing environment, in accordance with certain described embodiments of the invention.

FIG. 1 illustrates a block diagram of a computing environment, in accordance with certain embodiments of the invention. A host system 110 may be connected to a plurality of computational devices 102a . . . 102n over a network 104. The host system 100 sends and receives packets over the network 104. The packets may be for communication between the host system 100 and one or more of the computational devices 102a . . . 102n. The host system 100 may be any computational device known in the art, such as a personal computer, a workstation, a server, a mainframe, a hand held computer, a palm top computer, a laptop computer, a telephony device, a network computer, etc. The computational devices 102a . . . 102n may include various types of computers, routers, storage devices, etc. The network 104 may be any network known in the art, such as the Internet, an intranet, a Local area network (LAN), a Storage area network (SAN), a Wide area network (WAN), a wireless network etc. Also the network 104 may be part of one or more larger networks or may be an independent network or may be comprised of multiple interconnected networks. In certain embodiments, the network 104 may be implemented with high speed switching technologies, such as, Gigabit Ethernet technology.

The host system 100 may comprise at least one host processor 106, a host memory 108, at least one host application 110, and a network adapter 112. Instructions that comprise the host application 110 may be stored in the host memory 108 and executed by the host processor 106. Certain regions of the host memory 108 may comprise a buffer pool 114, where the buffer pool 114 is memory of the host system 100 that is utilized for processing by the network adapter 112. The buffer pool 114 is also referred to as an anonymous buffer pool 114 because the address of the buffer pool 114 can be in a plurality of locations in the host memory 108 of the host system 110 and the address does not have to be exposed directly or indirectly to the host application 110 that runs on the host system 100, i.e., the buffer pool 114 is anonymous to the host application 110. The anonymous buffer pool 114 may include a plurality of memory buffers. The host application 110 may generate commands related to the TCP/IP protocol for the network adapter 112. For example, the host application 110 may send or receive packets via the network adapter 112.

The network adapter 112 may include any network adapter known in the art that includes hardware support for processing at least some commands related to at least one IP protocol, such as, the TCP/IP protocol. For example, the network adapter 112 may include a TCP offload engine adapter or any other offload adapter known in the art.

The network adapter 112 includes an adapter processor 116, an adapter memory 118, and a protocol processor, such as, a protocol processing application 120, that processes commands related to a network communications protocol. The adapter processor 116 may be implemented as an application specific integrated circuit (ASIC). The adapter memory 118 may be any memory known in the art, and in certain embodiments may be referred to as a side random access memory (side RAM). In certain embodiments, the storage capacity of the adapter memory 116 is significantly less that of the host memory 108. The protocol processing application 120 may be implemented in hardware or software in the network adapter 112. If the protocol processing application 120 is implemented in software, code for the protocol processing application 120 may reside in the adapter memory 118 or any other storage on the network adapter 112. In certain embodiments, the protocol processing application 120 may be implemented as an application Specific integrated circuit in hardware as part of the network adapter 112. In alternative embodiments, the protocol processing application 120 may reside outside the network adapter 112, such as in the host memory 108 of the host system 100. In yet additional embodiments, the network adapter 112 including the protocol processing application 120 may be implemented in the host processor 106.

The protocol processing application 120 utilizes the host memory 108 for protocol processing and data staging, thereby minimizing memory requirements of the adapter memory 118. Since the adapter memory 118 may be significantly smaller in storage capacity than the host memory 108, packets may sometimes be processed at a faster rate when the host memory 108 is utilized by the protocol processing application 120. Furthermore, since the memory requirements of the adapter memory are reduced, the cost of the network adapter 112 may be reduced.

FIG. 1 illustrates how the protocol processing application 120 in the network adapter 112 utilizes the anonymous buffer pool 114 in the host memory 108 for TCP/IP protocol processing.

Figure 2:
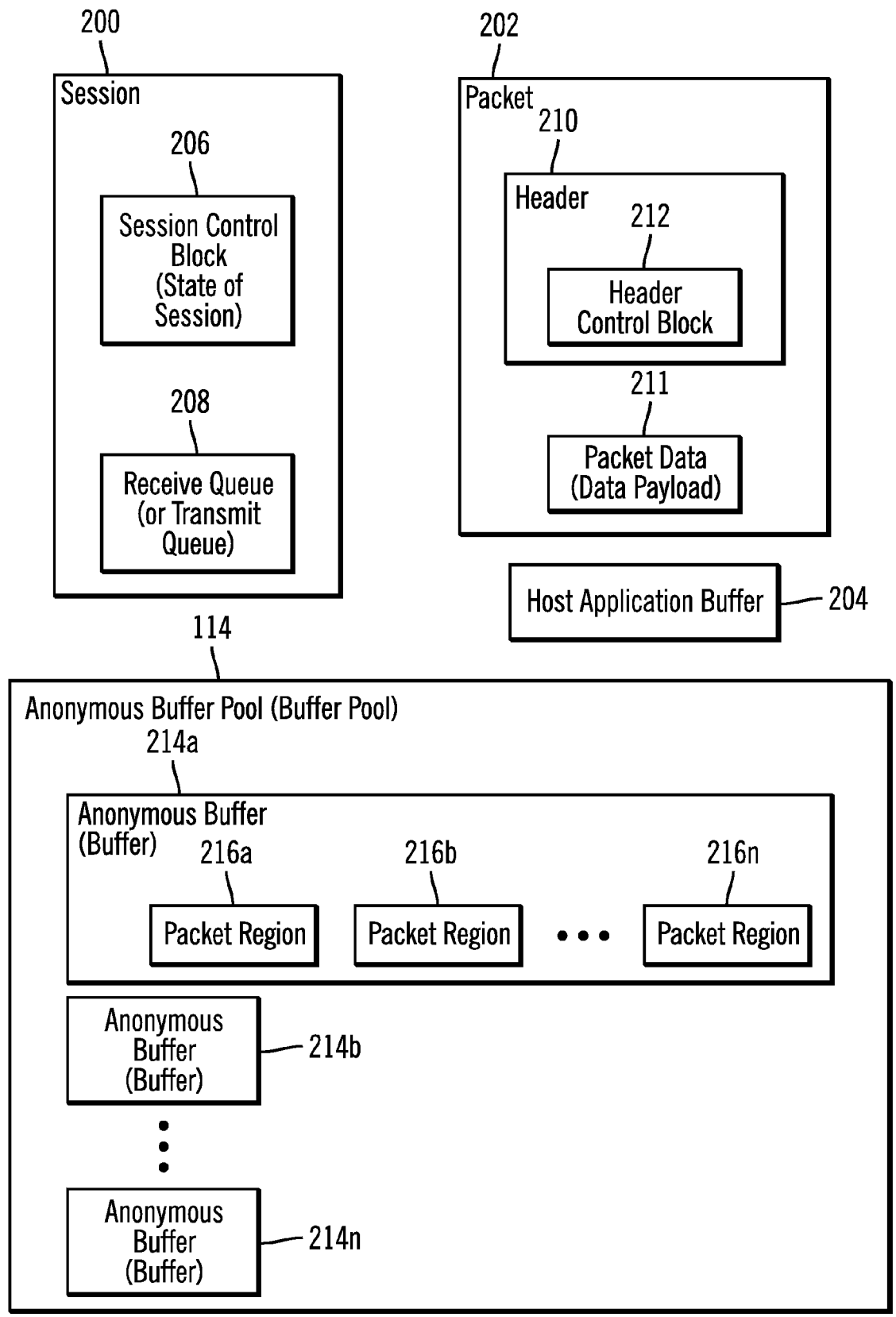
FIG. 2 illustrates a block diagram of data structures implemented in the computing environment, in accordance with certain described embodiments of the invention.

FIG. 2 illustrates a block diagram representing data structures implemented in the host 100, in accordance with certain embodiments of the invention. Data structures implemented in the host include data structures representing a session 200, a packet 202, a host application buffer 204, and the anonymous buffer pool 114. The data structures representing the session 200, the packet 202, the host application buffer 204 and the anonymous buffer pool 114 may be implemented in the host memory 108.

The session 200 may represent a TCP/IP session, where the TCP/IP session is a set of related data exchanges established between the host system 100 and a computational device 102a . . . 102n. Although data structures corresponding to a single session 200 are shown in FIG. 2, a plurality of sessions may be established between the host system 100 and the computational devices 102a . . . 102n. Corresponding to session 200 there is a session control block 206 and a receive queue 208. The session control block 206 stores information representing the state of a session. For example, the session control block 206 may include the number of packets received in a particular session, the number of packets sent in a particular session, etc. The session control block 206 may also include a pointer to a buffer address in the anonymous buffer pool 114 where packet data related to the packets of the session 200 are stored. The session 200 has a receive queue 208 that corresponds to the session 200. The receive queue 208 is a data structure representing the packets received and queued for processing in the session 200. There is one receive queue per session in the host memory 108 for exchanging data between in the host system 100 and a computational device 102a . . . 102n. In certain implementations, the receive queue 208 may be used as a transmit queue 208 for transmitting packets.

The packet 202 may represent a TCP/IP packet for communication between the host system 100 and a computational device 102a . . . 102n. FIG. 2 illustrates one representative packet. In embodiments of the invention, a plurality of packets are used for communication. The packet 202 may include a header 210 and packet data 211 where the packet data is a data payload. The header may include a header control block 212. The protocol processing application 120 is capable of updating the session control block 206 based on information included in the header control block 212 of a packet 202 that has been received via the network 104. Additionally, the protocol processing application 120 is capable of updating the header control block 212 of a packet being sent via the network adapter 112, where the information to update the header control block 212 may be extracted from the session control block 206.

The host application buffer 204 is a region of the host memory 108 that is allocated to the host application 110. The host application 110 may allocate the host application buffer 204 for storing and processing data included in packets.

The anonymous buffer pool 114 comprises a plurality of buffers 214a . . . 214n, also referred to as anonymous buffers 214a . . . 214n because the addresses of the plurality of buffers 214a . . . 214n do not have to be exposed directly or indirectly to the host application 110, i.e., the buffers 214a . . . 214n are anonymous to the host application 110. The anonymous buffers 214a . . . 214n are buffers in the host memory 108 that are used by the protocol processing application 120 for TCP/IP protocol processing. The anonymous buffers 214a . . . 214n are registered with the protocol processing application 120 and an anonymous buffer 214a . . . 214n may be a contiguous, non-pageable memory reserved from the operating system that runs on the host system 100.

An anonymous buffer, such as, anonymous buffer 214a, may include a plurality of packet regions 216a . . . 216n that are registered with the protocol processing application 120. In certain embodiments, the size of a packet region 216a . . . 216n may be equal to the size of the underlying transport's Maximum Transfer Unit (MTU). The MTU of a packet switching technology is a fixed upper bound on the amount of data that can be transferred in one physical frame. For example in certain embodiments, Gigabit Ethernet may limit transfers to 1500 octets of data per frame. In certain embodiments, an anonymous buffer 214a . . . 214n may have an unique identification, such as, the physical address of the first byte. A packet region 216a . . . 216n may be uniquely identified by the identifier of the anonymous buffer that includes the packet region 216a . . . 216n and the offset location of the packet region 216a . . . 216n within the anonymous buffer.

Dividing the anonymous buffer pool 114 into individual anonymous buffers 214a . . . 214n allows the protocol processing application 120 to create an anonymous buffer 214a . . . 214n in a size allowed by the operating system that runs on the host system 100. As a result, even operating systems that cannot guarantee more than a page size of contiguous memory to be reserved and locked-down in a single request can be used in embodiments of the invention, where Reserving memory allocates memory to a request and locking down the memory prevents other requests from writing to the allocated memory.

Dividing an anonymous buffer 214a . . . 214n into packet regions 216a . . . 216n also allows the protocol processing application 120 to use a packet region to save the data payload in a full sized incoming packet, and link the packet region to the appropriate protocol control block (PCB) context of the session the packet belongs to. A packet region 216a . . . 216n is a region of memory in the anonymous buffers 214a . . . 214n, where the size of a packet region 216a . . . 216n may be equal to the size of the underlying transport's MTU, and a full sized incoming packet may be equal to the size of the underlying transport's MTU. The packet regions may be recycled, i.e., reused, after packets have been reassembled.

Certain embodiments implement a single anonymous buffer pool 114 for all network sessions. The network adapter 112 may use the anonymous buffers 214a . . . 214n in the anonymous buffer pool 114 for a plurality of sessions. Therefore, FIG. 2 illustrates how anonymous buffers 214a . . . 214n may be used for staging incoming and outgoing packets of a network session.

Figure 3:
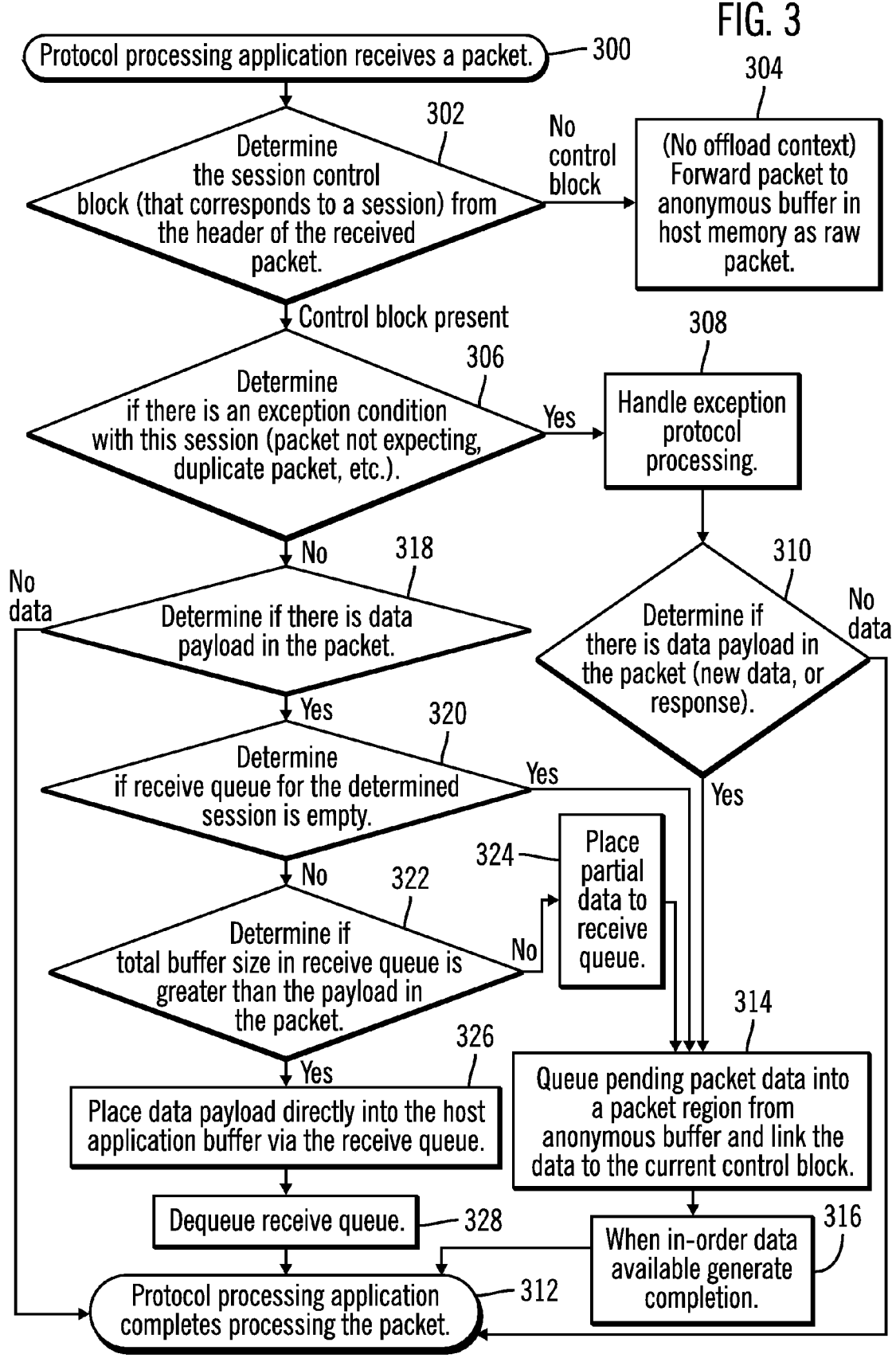
FIG. 3 illustrates operations, in accordance with certain described embodiments of the invention.

FIG. 3 illustrates operations implemented by the protocol processing application 120, in accordance with certain embodiments of the invention.

Control starts at block 300, where the protocol processing application 120 receives a packet, such as, packet 202, delivered via the network 104 from one of the computational devices 102a . . . 102n. The protocol processing application 120 determines (at block 302) the session control block 206 that corresponds to a session 200, from the header control block 212 included in the header 210 of the received packet 202. If the protocol processing application 120 determines that there exists no session control block 206 that corresponds to the received packet, then control proceeds to block 304 where the protocol processing application 120 forwards the received packet to the anonymous buffer 214a in host memory 108 as a raw packet because no offload context is present for the received packet. The session control block 206 stores information representing the state of a session and if no session control block 206 is present then there is no established session corresponding to the received packet. The offload context refers to the context information associated with a received packet that is stored in the session control block 206. If no session control block 206 is present then there is no context information associated with received packet stored in the session control block 206.

If the protocol processing application 120 determines (at block 302) that a session control block 206 corresponds to the received packet then the protocol processing application 120 determines (at block 306) whether there is an exception condition associated with the session 200 corresponding to the session control block 206. If so, the protocol processing application 120 handles (at block 308) the exception protocol processing associated with the received packet. An exception condition is a condition assumed by a device or application when the device or application receives a command that the device or application cannot execute. For example, an exception condition may be associated with the session 200 because the session 200 is unable to normally process a packet because of some error. In such circumstances, the protocol processing application 120 may execute operations to recover from the exception condition by performing exception protocol processing.

The protocol processing application 120 determines (at block 310) whether there is any data payload in the received packet, where the data payload may include new data or may be a response to the host application 110. If there is no data payload in the received packet then the protocol processing application 120 completes (at block 312) processing the received packet. If the protocol processing application 120 determines (at block 310) that there is a data payload in the received packet then the protocol processing application 120 queues (at block 314) the pending packet data 211 corresponding to the data payload into a packet region, such as, packet region 216a, in an anonymous buffer 214a and links the packet data 211 to the current session control block 206. The protocol processing application 120 generates (at block 316) a completion signal corresponding to the processing of the received packet when in-order data is available, i.e., all the packets have arrived in sequence, and the protocol processing application 120 completes (at block 312) processing the packet.

If the protocol processing application 120 determines (at block 306) that there is no exception condition associated with the session 200 corresponding to the session control block 206, then the protocol processing application 120 determines (at block 318) whether there is a data payload in the received packet. If not, the protocol processing application 120 completes (at block 312) processing the packet. If the protocol processing application 120 determines (at block 318) that there is a data payload in the received packet, then the protocol processing application 120 determines (at block 320) whether the receive queue 208 for the determined session 200 is empty, i.e., the receive queue 208 does not include any host application buffers. If so, the protocol processing application 120 queues (at block 314) the pending packet data into a packet region from the anonymous buffer.

If the protocol processing application 120 determines (at block 320) that the receive queue 208 for the determined session 200 is not empty, then the protocol processing application 120 determines (at block 322) whether the total buffer size in the receive queue 208 is greater than the data payload in the packet. If not, the protocol processing application 120 places (at block 324) partial data payload into the receive queue and queues (at block 314) the packet data into a packet region from the anonymous buffer.

If the protocol processing application 120 determines (at block 322) that the total host application buffer in the receive queue 208 is greater than the data payload of the received packet then the protocol processing application 120 places (at block 326) the data payload directly into host application buffer 204 via receive queue 208. The protocol processing application 120 dequeues (at block 328) the receive queue and completes (at block 312) processing the received packet.

Therefore, the operations of FIG. 3 use the anonymous buffers 214a . . . 214n in the host memory 108 for processing the data payload of received packets. By processing the data payload of received packets in host memory 108 as opposed to processing the data payload in the adapter memory 118, the protocol processing application 120 may speed up the processing of packets. On high speed networks the received packets may be numerous and the reduced amount of adapter memory 118 compared to the amount of the host memory 108 may otherwise have reduced the rate at which data payload in the received packets could be processed. Furthermore, the reduced amount of adapter memory 118 may reduce the cost of the network adapter 112.

Figure 4:
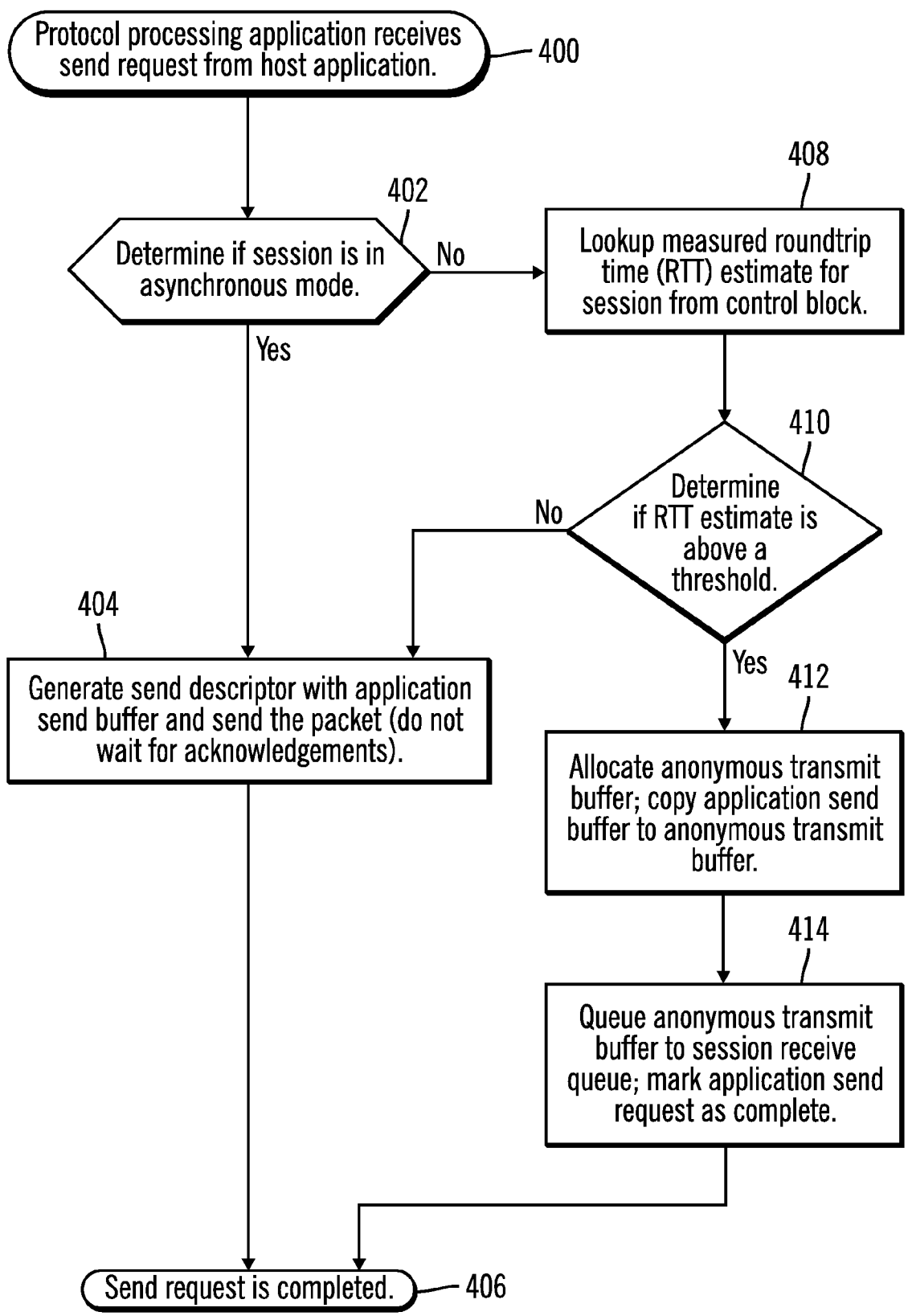
FIG. 4 illustrates operations, in accordance with certain described embodiments of the invention.

FIG. 4 illustrates operations implemented by the protocol processing application 120, in accordance with certain embodiments of the invention.

Control starts at block 400 where the protocol processing application 120 receives a send request from the host application 110. The send request is a request to send a packet from the host system 100 to a computational device 102a . . . 102n over the network 104. The protocol processing application 120 determines (at block 402) whether a session 200 that corresponds to the send request is in an asynchronous mode, i.e., in the course of the session 200 packets may be sent asynchronously by not waiting for acknowledgments after sending a packet. In asynchronous mode new packets may be sent without waiting for acknowledgments of earlier sent packets. In synchronous mode new packets may be sent only after acknowledgments have been received for earlier sent packets. If the session 200 is in an asynchronous mode, then the protocol processing application 120 generates (at block 404) a send descriptor with an application send buffer, such as, the host application buffer 204, that is associated with the packet and sends the packet. The protocol processing application 120 does not wait for acknowledgments before sending the next packet and the protocol processing application 120 completes (at block 406) the send request.

If the protocol processing application 120 determines (at block 402) that the underlying session 200 is not in asynchronous mode, i.e., the session 200 is in synchronous mode, then the protocol processing application 120 performs (at block 408) a lookup of the measured round-trip time (RTT) estimate for the session 200 from the session control block 206 of the session 200. RTT estimate is a measure of the time it takes for a packet to travel from a computer, across a network to another computer, and back. Transport protocols like TCP which expect an acknowledgment to arrive after data has been successfully received, keep an estimate of the current RTT on each connection, and use the RTT estimate to determine how long to wait for an acknowledgment before retransmitting. The protocol processing application 120 determines (at block 410) whether the RTT estimate is above a threshold. If so, then the protocol processing application 412 allocates (at block 412) an anonymous buffer, such as, anonymous buffer 214a, for transmitting packets. The protocol processing application 120 copies the application send buffer to the anonymous buffer 214a for transmitting. The protocol processing application 120 queues (at block 414) the anonymous buffer 214a to the transmit queue 208 of the session 200. The protocol processing application 120 marks the application send request as complete and competes (at block 406) the processing of the send request. In certain embodiments, marking the application send request as complete may be achieved by associating a boolean variable with every application send request and assigning the boolean variable to true when the application send request is completed.

If the protocol processing application 120 determines (at block 410) that the RTT estimate is not above the threshold, then the protocol processing application 120 generates (at block 404) the send descriptor with the application send buffer and subsequently completes (at block 406) the processing of the send request. When the RTT estimate is above the threshold, then the protocol processing application 120 is waiting for a period that is too long for acknowledgments before retransmission of packets.

FIG. 4 illustrates how the protocol processing application 120 uses the anonymous buffers 214a . . . 214n in the host memory 108 to queue data for sending over the network 104. The protocol processing application 120 uses the relatively greater storage capacity of the host memory 108 rather than the relatively lesser storage capacity of adapter memory 118 for queuing packets while transmitting packets over the network 104. As a result, the overall throughput of the host application 110 may increase when compared to situations where the packets are queued in the adapter memory 118.

Figure 5:
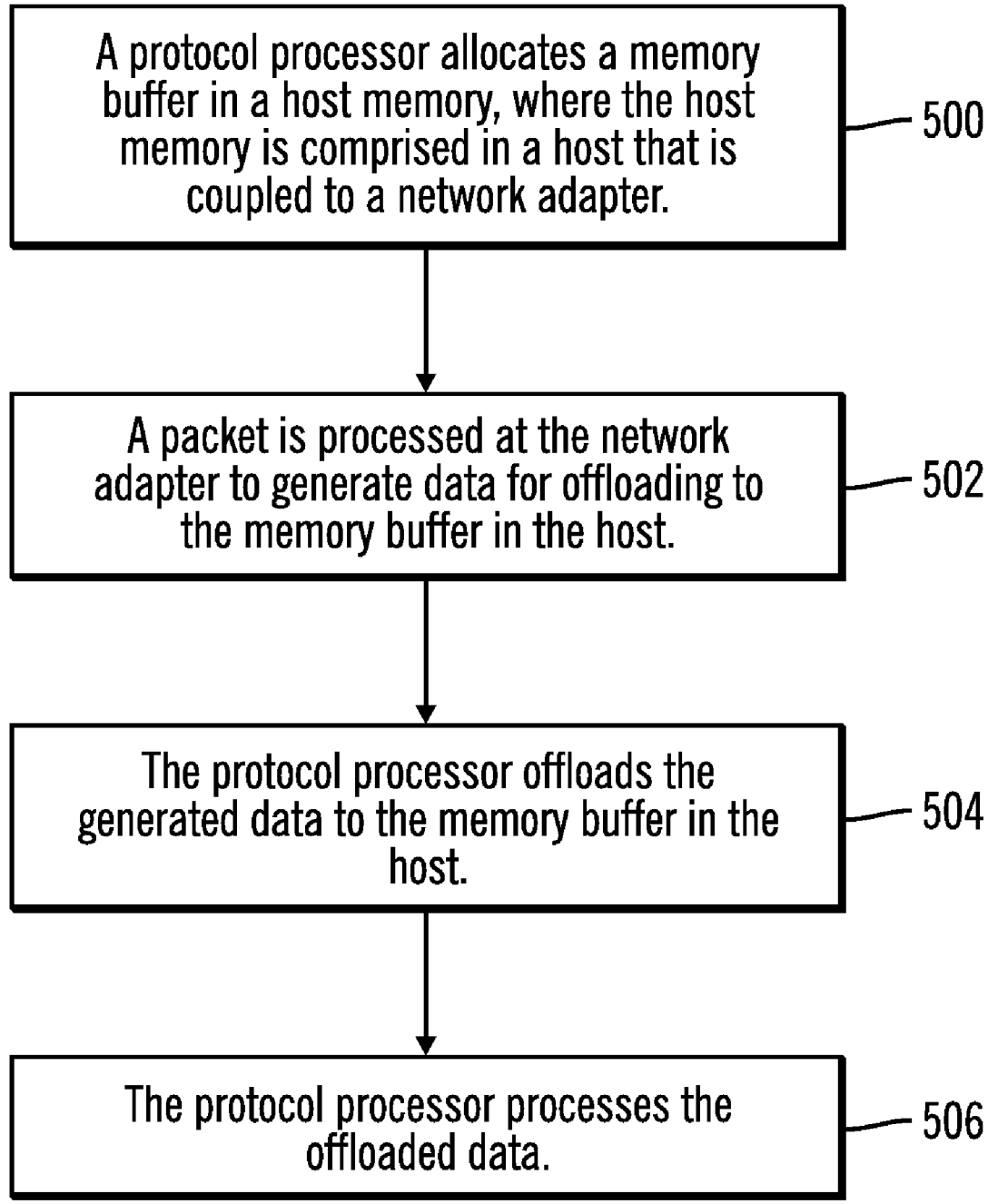
FIG. 5 illustrates operations, in accordance with certain described embodiments of the invention.

FIG. 5 illustrates operations implemented by the protocol processor 120, such as, the protocol processing application 120, in accordance with certain embodiments of the invention.

Control starts at block 500 where protocol processor 120 allocates the memory buffer 214a in the host memory 108, where the host memory 108 is comprised in the host 100 that is coupled to the network adapter 112. The protocol processor 120 processes a packet 202 at the network adapter 112 to generate data for offloading to the memory buffer 214a in the host 100. The protocol processor 120 offloads the generated data to the memory buffer 214a in the host 100. Offloading the generated data moves the generated data from the network adapter 112 to the memory buffer 214a in the host 100. Subsequently, the protocol processor 120 processes the offloaded data.

The embodiments comprise a protocol processor 120, such as, a protocol processing application 120 implemented in a network adapter 112 coupled to a host system 110. The protocol processing application 120 utilizes the host memory 108 in the host system 110 for protocol processing and data staging for both sending and receiving packets and minimizes memory requirements in the network adapter 112.

The embodiments reduce the need for data staging buffers in adapter memory resulting in a smaller adapter memory size. Both in-order and out-of-order packets are processed by the embodiments. The embodiments may also process fragmented packets. Certain embodiments may be implemented in LAN-on-motherboard configurations. The embodiments are also suited for TOE integration to processor chip sets. The embodiments may support integrated layer processing of network protocols and may support upper-layer direct data placement and remote direct memory access (RDMA) protocols. The embodiments allow the network adapter to process a large number of packets at a rate that is adequate for the flow of packets by offloading packet data to the host memory.

ADDITIONAL EMBODIMENT DETAILS

The described techniques may be implemented as a method, apparatus or article of manufacture involving software, firmware, micro-code, hardware or any combination thereof The term "article of manufacture" as used herein refers to code or logic implemented in hardware logic (e.g., an integrated circuit chip, Programmable Gate Array (PGA), ASIC, etc.) or a computer readable medium (e.g., magnetic storage medium, such as hard disk drives, floppy disks, tape), optical storage (e.g., CD-ROMs, DVD-ROMs, optical disks, etc.), volatile and non-volatile memory devices (e.g., Electrically Erasable Programmable Read Only Memories (EEPROMs), Read Only Memories (ROMs), Programmable Read Only Memories (PROMs), Random Access Memories (RAMs), Dynamic Random Access Memories (DRAMs), Static Random Access Memories (SRAMs), flash, firmware, programmable logic, etc.). Code in the computer readable medium may be accessed and executed by a machine, such as, a processor. The code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art.

Figure 6:
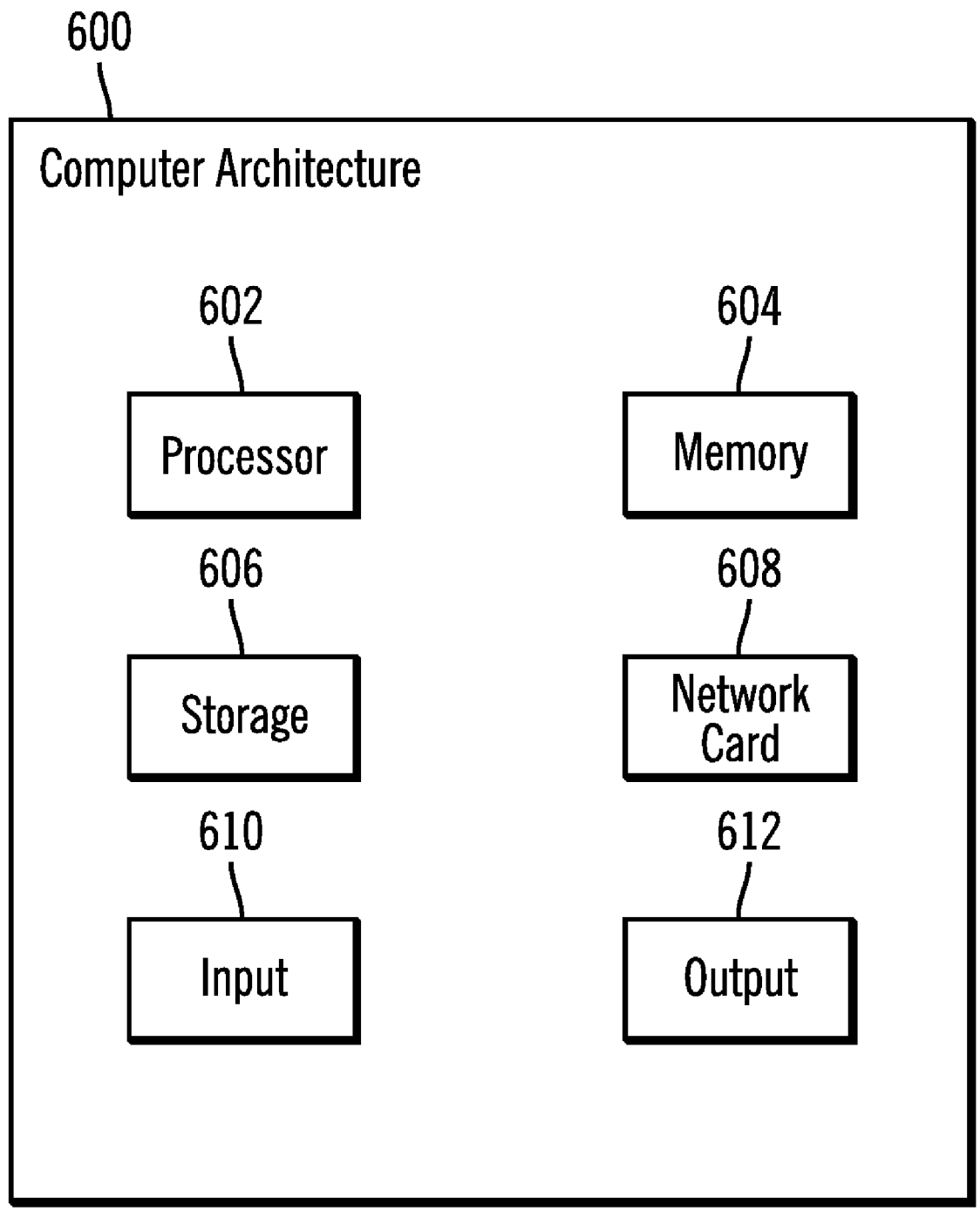
FIG. 6 illustrates a block diagram of a computer architecture in which certain described embodiments of the invention are implemented.

FIG. 6 illustrates a block diagram of a computer architecture in which certain embodiments are implemented. FIG. 6 illustrates one embodiment of the host system 100. The host system 100 may implement a computer architecture 600 having a processor 602 (such as the host processor 106), a memory 604 (e.g., a volatile memory device, such as, the host memory 108), and storage 606. The storage 606 may include non-volatile memory devices (e.g., EEPROMs, ROMs, PROMs, RAMs, DRAMs, SRAMs, flash, firmware, programmable logic, etc.), magnetic disk drives, optical disk drives, tape drives, etc. The storage 606 may comprise an internal storage device, an attached storage device or a network accessible storage device. Programs in the storage 606 may be loaded into the memory 604 and executed by the processor 602 in a manner known in the art. The architecture may further include a network card 608 (such as network adapter 112) to enable communication with a network. The architecture may also include at least one input 610, such as a keyboard, a touchscreen, a pen, voice-activated input, etc., and at least one output 612, such as a display device, a speaker, a printer, etc.

In certain implementations, network adapter may be included in a computer system including any storage controller, such as a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative implementations, the network adapter embodiments may be included in a system that does not include a storage controller, such as certain hubs and switches. Further details of SCSI are described in the publication entitled "Information Technology: SCSI-3 Architecture Model," prepared by the X3T10 Technical Committee (published November 1995). Further details of ATA are described in the publication entitled "AT Attachment-3 Interface (ATA-3)" prepared by the X3T10 Technical Committee (published October 1995).

In certain implementations, the embodiments may be implemented in a computer system including a video controller to render information to display on a monitor coupled to the computer system including the network adapter 112, such as a computer system comprising a desktop, workstation, server, mainframe, laptop, handheld computer, etc. An operating system may be capable of execution by the computer system, and the video controller may render graphics output via interactions with the operating system. Alternatively, the embodiments may be implemented in a computer system that does not include a video controller, such as a switch, router, etc.

At least certain of the operations of FIGS. 3, 4, and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into fewer number of components or divided into larger number of components. Additionally, certain operations described as performed by a specific component may be performed by other components. In certain implementations the network adapter may be a specialized part of the central processing unit of the host system.

The data structures and components shown or referred to in FIGS. 1-6 are described as having specific types of information. In alternative embodiments, the data structures and components may be structured differently and have fewer, more or different fields or different functions than those shown or referred to in the figures. Furthermore, although the embodiments have been described with respect to TCP/IP any other protocol may also be used by the embodiments.

Therefore, the foregoing description of the embodiments has been presented for the purposes of illustration and description. It is not intended to be exhaustive or to limit the invention to the precise form disclosed. Many modifications and variations are possible in light of the above teaching.

What is claimed is:

1. A method, comprising:

allocating, by a protocol processor included in a network adapter, a memory buffer in a host memory, wherein the host memory is comprised in a host that is coupled to the network adapter;

initially processing a packet at the network adapter to generate data for offloading to the memory buffer in the host;

offloading, by the protocol processor, the generated data to the memory buffer in the host; and subsequent to the offloading by the protocol processor of the generated data to the memory buffer in the host, processing, by the protocol processor, the offloaded data, wherein the method further comprises:

(i) dividing the memory buffer into a plurality of buffers, wherein the plurality of buffers stores packet data associated with a plurality of network sessions, wherein an address of the memory buffer is not exposed directly or indirectly to a host application that executes in the host, and wherein the memory buffer comprises a non-pageable memory;

(ii) dividing a buffer into one or more packet regions, wherein a size of a packet region exceeds a size of a maximum transmission unit of packets associated with a protocol; and (iii) storing a first packet data associated with a first packet in a first packet region, wherein if a data payload in the first packet exceeds a size of the host application buffer, then queuing the data payload into the memory buffer.

2. The method of claim 1, further comprising:

receiving a send request at the protocol processor from a host application on the host;

determining if a session associated with the send request is in a synchronous mode, wherein if the session is in the synchronous mode then offloading the send request to the memory buffer; and indicating to the host application that the send request is completed.

3. The method of claim 1, further comprising:

receiving a send request at the protocol processor from a host application on the host, wherein an application send buffer is associated with the send request; and copying the application send buffer to the memory buffer.

4. The method of claim 1, wherein the protocol processor is coupled to the network adapter, wherein the network adapter is an offload engine adapter, and wherein the host memory is larger in size than an adapter memory coupled to the network adapter.

5. The method of claim 1, wherein the memory buffer comprises a plurality of buffers, wherein the memory buffer stores the offloaded data for a plurality of sessions, and wherein the offloaded data for a first session is stored in at least one buffer.

6. The method of claim 1, wherein the protocol processor is implemented in hardware or software, and wherein the network adapter is a part of a central processing unit of the host.

7. A network adapter, wherein the network adapter is coupled to a host having a host memory, and wherein a memory buffer is implemented in the host memory, the network adapter comprising:

a memory coupled to the network adapter;

a protocol processor included in the network adapter, wherein the protocol processor is allocates the memory buffer, wherein the protocol processor initially processes a packet at the network adapter to generate data to offload to the memory buffer, wherein the protocol processor offloads the generated data to the memory buffer in the host, and wherein the protocol processor processes the offloaded data subsequent to offloading the generated data to the memory buffer in the host, wherein the protocol processor further performs:

(i) dividing the memory buffer into a plurality of buffers to store packet data associated with a plurality of network sessions, wherein an address of the memory buffer is not exposed directly or indirectly to a host application that executes in the host, and wherein the memory buffer comprises a non-pageable memory;

(ii) dividing a buffer into one or more packet regions, wherein a size of a packet region exceeds a size of a maximum transmission unit of packets associated with a protocol; and (iii) storing a first packet data associated with a first packet in a first packet region, wherein if a data payload in the first packet exceeds a size of the host application buffer, then queuing the data payload into the memory buffer.

8. The network adapter of claim 7, wherein the protocol processor performs:
receiving a send request from a host application on the host;
determining if a session associated with the send request is in a synchronous mode;
offloading the send request to the memory buffer if the session is in the synchronous mode; and
indicating to the host application that the send request is completed.

9. The network adapter of claim 7, wherein the protocol processor performs:
receiving a send request from a host application on the host, wherein an application send buffer is associated with the send request; and
copying the application send buffer to the memory buffer.

10. The network adapter of claim 7, wherein the protocol processor is coupled to the network adapter, wherein the network adapter is an offload engine adapter, and wherein the host memory is larger in size than the memory coupled to the network adapter.

11. The network adapter of claim 7, wherein the protocol processor performs:
dividing the memory buffer into a plurality of buffers;
storing offloaded data for a plurality of sessions in the plurality of buffers; and
storing the offloaded data for a first session in at least one buffer.

12. The network adapter of claim 7, wherein the protocol processor is implemented in hardware or software, and wherein the network adapter is a part of a central processing unit of the host.

13. A system in communication with data storage, comprising:
a host;
a data storage controller to manage Input/Output (I/O) access to the data storage, wherein the data storage controller is coupled to the host;
a network adapter coupled to the host;
a host memory coupled to the host;
a memory buffer implemented in the host memory, wherein a protocol processor included in the network adapter is allocates the memory buffer, wherein the protocol processor initially processes a packet at the network adapter to generate data to offload to the memory buffer, wherein the protocol processor is offloads the generated data to the memory buffer in the host, and wherein the protocol processor processes the offloaded data subsequent to offloading the generated data to the memory buffer in the host, wherein:
(i) the memory buffer is divided into a plurality of buffers, wherein the plurality of buffers stores packet data associated with a plurality of network sessions, wherein an address of the memory buffer is not exposed directly or indirectly to a host application that executes in the host, and wherein the memory buffer comprises a non-pageable memory;

(ii) a buffer is divided into one or more packet regions, wherein a size of a packet region exceeds a size of a maximum transmission unit of packets associated with a protocol; and (iii) a first packet data associated with a first packet is stored in a first packet region, wherein if a data payload in the first packet exceeds a size of the host application buffer, then queuing the data payload into the memory buffer.

14. The system of claim 13, further comprising:
a host application on the host, wherein the protocol processor receives a send request from the host application, wherein the protocol processor determines if a session associated with the send request is in an synchronous mode, wherein the protocol processor performs the offloading of the send request to the memory buffer if the session is in the synchronous mode, and wherein the protocol processor indicates to the host application that the send request is completed.

15. An article of manufacture, comprising a storage medium having stored therein instructions that when executed by a machine results in the following:
allocating a memory buffer in a host memory, wherein the host memory is comprised in a host that is coupled to a network adapter;
initially processing a packet at the network adapter to generate data for offloading to the memory buffer in the host;
offloading, by a protocol processor included in the network adapter, the generated data to the memory buffer in the host; and
subsequent to the offloading by the protocol processor of the generated data to the memory buffer in the host, processing, by the protocol processor, the offloaded data, wherein the instructions when executed further results in the following:
(i) dividing the memory buffer into a plurality of buffers, wherein the plurality of buffers stores packet data associated with a plurality of network sessions, wherein an address of the memory buffer is not exposed directly or indirectly to a host application that executes in the host, and wherein the memory buffer comprises a non-pageable memory;

(ii) dividing a buffer into one or more packet regions, wherein a size of a packet region exceeds a size of a maximum transmission unit of packets associated with a protocol; and (iii) storing a first packet data associated with a first packet in a first packet region, wherein if a data payload in the first packet exceeds a size of the host application buffer, then queuing the data payload into the memory buffer.

16. The article of manufacture of claim 15, wherein the instructions when executed further results in the following:
receiving a send request at the network adapter from a host application on the host;
determining if a session associated with the send request is in a synchronous mode, wherein if the session is in the synchronous mode then performing the offloading of the send request to the memory buffer; and
indicating to the host application that the send request is completed.

17. The article of manufacture of claim 15, wherein the instructions when executed further results in the following:
  receiving a send request at the network adapter from a host application on the host, wherein an application send buffer is associated with the send request; and
  copying the application send buffer to the memory buffer.

18. The article of manufacture of claim 15, wherein the network adapter is an offload engine adapter, and wherein the host memory is larger in size than a memory coupled to the network adapter.

19. The article of manufacture of claim 15, wherein the memory buffer comprises a plurality of buffers, wherein the instructions when executed store offloaded data for a plurality of sessions in the memory buffer, and wherein the instructions when executed offload data for a first session in at least one buffer.

20. The article of manufacture of claim 15, wherein the instructions are implemented in hardware or software, and wherein the network adapter is a part of a central processing unit of the host.

21. The method of claim 1, wherein while transmitting packets the protocol processor uses the relatively greater storage capacity of the host memory rather than the relatively lesser storage capacity of an adapter memory for queuing packets, wherein the adapter memory is coupled to the network adapter.

22. The method claim 21, further comprising:
  receiving, at the protocol processor, a send request from the host application;
  determining if a measured roundtrip time estimate for a network session is above a threshold, in response to determining that the network session is in a synchronous mode;
  allocating an anonymous transmit buffer and copying an application send buffer to the anonymous transmit buffer, in response to determining that the measured roundtrip time estimate for the network session is above the threshold; and
  queuing the anonymous transmit buffer to a session receive queue and marking the send request as complete.

23. The network adapter of claim 7, wherein while transmitting packets the protocol processor uses the relatively greater storage capacity of the host memory rather than the relatively lesser storage capacity of an adapter memory for queuing packets, wherein the adapter memory is coupled to the network adapter.

24. The network adapter of claim 23, wherein the protocol processor further performs:
  receiving a send request from the host application;
  determining if a measured roundtrip time estimate for a network session is above a threshold, in response to determining that the network session is in a synchronous mode;
  allocating an anonymous transmit buffer and copying an application send buffer to the anonymous transmit buffer, in response to determining that the measured roundtrip time estimate for the network session is above the threshold; and
  queuing the anonymous transmit buffer to a session receive queue and marking the send request as complete.

25. The system of claim 13, wherein while transmitting packets the protocol processor uses the relatively greater storage capacity of the host memory rather than the relatively lesser storage capacity of an adapter memory for queuing packets, wherein the adapter memory is coupled to the network adapter.

26. The system of claim 25, wherein the protocol processor further performs:
  receiving a send request from the host application;
  determining if a measured roundtrip time estimate for a network session is above a threshold, in response to determining that the network session is in a synchronous mode;
  allocating an anonymous transmit buffer and copying an application send buffer to the anonymous transmit buffer, in response to determining that the measured roundtrip time estimate for the network session is above the threshold; and
  queuing the anonymous transmit buffer to a session receive queue and marking the send request as complete.

27. The article of manufacture of claim 15, wherein while transmitting packets the protocol processor uses the relatively greater storage capacity of the host memory rather than the relatively lesser storage capacity of an adapter memory for queuing packets, wherein the adapter memory is coupled to the network adapter.

28. The article of manufacture of claim 27, wherein the instructions when executed further results in the following:
  receiving, at the protocol processor, a send request from the host application;
  determining if a measured roundtrip time estimate for a network session is above a threshold, in response to determining that the network session is in a synchronous mode;
  allocating an anonymous transmit buffer and copying an application send buffer to the anonymous transmit buffer, in response to determining that the measured roundtrip time estimate for the network session is above the threshold; and
  queuing the anonymous transmit buffer to a session receive queue and marking the send request as complete.

* * * * *